(12) United States Patent
Watanabe et al.

(10) Patent No.: US 11,125,304 B2
(45) Date of Patent: Sep. 21, 2021

(54) TENSIONER

(71) Applicant: TSUBAKIMOTO CHAIN CO., Osaka (JP)

(72) Inventors: Masanori Watanabe, Osaka (JP); Yudai Takagi, Osaka (JP); Yuji Kurematsu, Osaka (JP)

(73) Assignee: TSUBAKIMOTO CHAIN CO., Osaka (JP)

( * ) Notice: Subject to any disclaimer, the term of this patent is extended or adjusted under 35 U.S.C. 154(b) by 353 days.

(21) Appl. No.: 16/287,448

(22) Filed: Feb. 27, 2019

(65) Prior Publication Data

US 2019/0323580 A1 Oct. 24, 2019

(30) Foreign Application Priority Data

Apr. 18, 2018 (JP) .............................. JP2018-079508

(51) Int. Cl.
*F16H 7/08* (2006.01)

(52) U.S. Cl.
CPC ............ *F16H 7/0848* (2013.01); *F16H 7/08* (2013.01); *F16H 2007/0802* (2013.01); *F16H 2007/0806* (2013.01); *F16H 2007/0812* (2013.01); *F16H 2007/0814* (2013.01); *F16H 2007/0859* (2013.01); *F16H 2007/0895* (2013.01); *F16H 2007/0897* (2013.01)

(58) Field of Classification Search
CPC ............... F16H 7/08; F16H 2007/0802; F16H 2007/0806; F16H 2007/0808; F16H 2007/0812; F16H 2007/0814; F16H 2007/0817; F16H 7/0848; F16H 2007/0859; F16H 2007/0895; F16H 2007/0897

See application file for complete search history.

(56) References Cited

U.S. PATENT DOCUMENTS

| 6,322,468 | B1 * | 11/2001 | Wing | ........................ F16H 7/08 474/109 |
| 6,398,682 | B1 | 6/2002 | Suzuki et al. | |
| 6,435,993 | B1 * | 8/2002 | Tada | ..................... F16H 7/0836 474/109 |
| 2006/0003859 | A1 * | 1/2006 | Sato | ...................... F16H 7/0836 474/110 |

(Continued)

FOREIGN PATENT DOCUMENTS

| EP | 1323948 A1 | 7/2003 |
| JP | 2001-12569 A | 1/2001 |
| JP | 2003-194164 A | 7/2003 |

*Primary Examiner* — Michael R Mansen
*Assistant Examiner* — Raveen J Dias
(74) *Attorney, Agent, or Firm* — Westerman, Hattori, Daniels & Adrian, LLP

(57) ABSTRACT

An orifice member is disposed in a plunger including a plunger hole that forms a hydraulic chamber in conjunction with a plunger housing hole in a housing. The orifice member includes a deformed fitting section deformed to fit on the inner circumferential surface of the plunger hole, a communication section that causes a surface in contact with the top surface on the front side of the plunger hole and a surface on the hydraulic chamber side to communicate, and an orifice groove that communicates with the communication section and an external relief hole provided in the plunger on the surface in contact with the top surface on the front side of the plunger hole to constitute an orifice.

5 Claims, 6 Drawing Sheets

(56) References Cited

U.S. PATENT DOCUMENTS

| | | | |
|---|---|---|---|
| 2006/0089221 A1* | 4/2006 | Hashimoto | F01L 1/02 474/110 |
| 2006/0094549 A1* | 5/2006 | Yoshida | F16H 7/0836 474/110 |
| 2007/0249444 A1* | 10/2007 | Yoshida | F16H 7/0836 474/110 |
| 2008/0090685 A1* | 4/2008 | Namie | F16H 7/0836 474/110 |
| 2011/0081997 A1* | 4/2011 | Markely | F16H 7/0848 474/110 |
| 2011/0263366 A1* | 10/2011 | Botez | F16H 7/0848 474/110 |
| 2013/0017913 A1* | 1/2013 | Hartmann | F16H 7/0848 474/110 |
| 2013/0337954 A1* | 12/2013 | Bauer | F16H 7/08 474/110 |
| 2014/0256486 A1* | 9/2014 | Lunk | F16H 7/0836 474/110 |
| 2015/0024887 A1* | 1/2015 | Oh | F16H 7/08 474/110 |
| 2015/0226345 A1* | 8/2015 | Hartmann | F16K 15/044 137/539 |
| 2016/0290447 A1* | 10/2016 | Kunimatsu | F16K 17/02 |
| 2016/0327135 A1* | 11/2016 | Fischer | F16H 7/0836 |
| 2017/0356528 A1* | 12/2017 | Fischer | F16H 7/08 |
| 2017/0370447 A1* | 12/2017 | Freemantle | F16H 7/0848 |
| 2018/0180191 A1* | 6/2018 | Shinoyama | F16K 17/196 |
| 2019/0128389 A1* | 5/2019 | Ullein | F16H 7/0834 |
| 2019/0170224 A1* | 6/2019 | Fuhrmann | F16H 7/08 |
| 2019/0195123 A1* | 6/2019 | Iwasaki | F16H 7/0829 |
| 2019/0277370 A1* | 9/2019 | Iwasaki | F16H 7/08 |
| 2019/0316658 A1* | 10/2019 | Sun | F16H 7/08 |
| 2019/0338836 A1* | 11/2019 | Benn | F16H 7/0848 |
| 2019/0353228 A1* | 11/2019 | Sun | F16H 7/0834 |
| 2020/0116172 A1* | 4/2020 | Sun | B01D 29/071 |
| 2020/0370625 A1* | 11/2020 | Cobb | F16H 7/0848 |
| 2020/0393023 A1* | 12/2020 | Ishikawa | F16K 17/04 |

\* cited by examiner

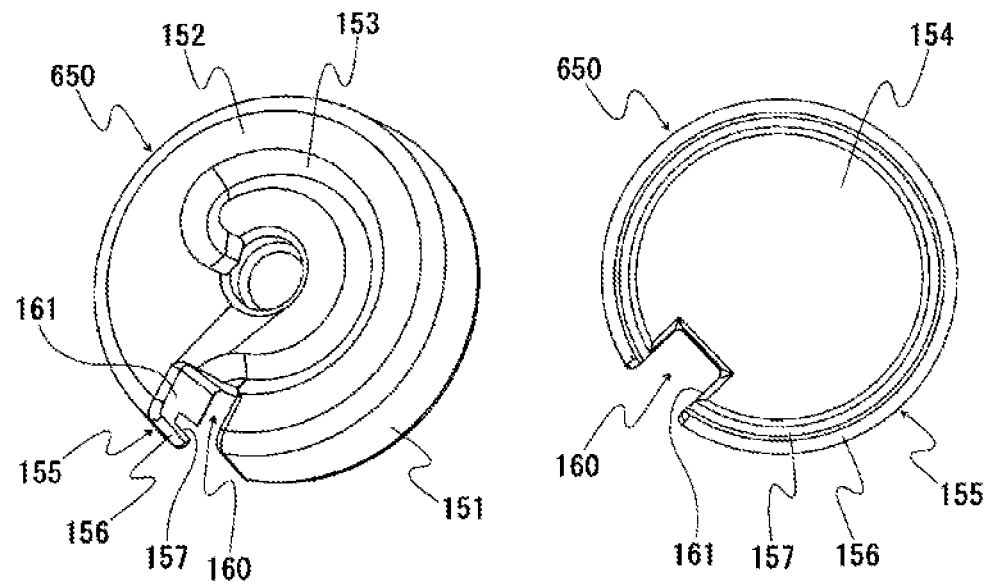
FIG. 9A   FIG. 9B
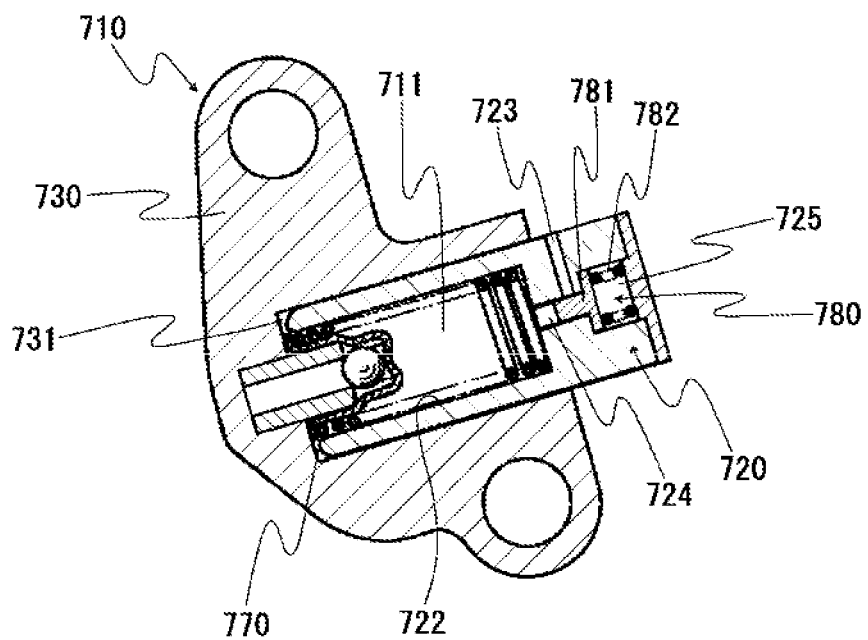
FIG. 10   RELATED ART

TENSIONER

BACKGROUND OF THE INVENTION

1. Field of the Invention

The present invention relates to a tensioner that applies proper tension to a traveling chain, belt, or the like.

2. Description of the Related Art

A tensioner has been in common use in order to property retain the tension of a chain or the like. For example, in a chain guide mechanism that performs, with a tensioner lever, sliding guide of a transmission chain such as a roller chain endlessly wound around between sprockets respectively provided in a crankshaft and a camshaft in an engine room, it is publicly known to urge the tensioner lever with a tensioner in order to properly retain the tension of the chain or the like.

As the tensioner used in such a chain guide mechanism, a tensioner is well known that includes a plunger including a plunger hole opening on the rear side, a housing including a plunger housing hole opening on the front side that slidably houses the plunger, main urging means for urging the plunger toward the front side, and a hydraulic chamber formed between the plunger housing hole and the plunger hole. The tensioner applies a dumping effect to a reciprocating movement of the plunger while relaxing pressure fluctuation in the hydraulic chamber with a leak of oil from a sliding section of the plunger and the plunger housing hole.

A tensioner is also well known in which a separate independent oil leak path is provided in order to relax a sudden pressure rise in a hydraulic chamber.

As the well-known tensioner in which the independent oil leak path is provided, there is known a tensioner 710 including, as shown in FIG. 10, a plunger 720 including a plunger hole 722 opening on the rear side, a housing 730 including a plunger housing hole 731 opening on the front side that houses the plunger 720, a relief mechanism 780 that relieves oil in a hydraulic chamber 711 to the outside of the plunger 720 when oil pressure in the hydraulic chamber 711 rises, and main urging means 770 stretchably housed in the hydraulic chamber 711 formed between the plunger 720 and the plunger housing hole 731, the main urging means 770 urging the plunger 720 to the front side (see, for example, Japanese Patent Application Publication No. 2001-012569).

In the tensioner 710 described in Japanese Patent Application Publication No. 2001-012569, a pressure passage 724 communicating with the hydraulic chamber 711, an outflow port 723 that causes the pressure passage 724 and the outside of the plunger 720 to communicate, and a spring housing chamber 725 formed on the front side of the pressure passage 724 are formed in the bottom of the plunger 720. The relief mechanism 780 is configured from a valve body 781 slidably fit and inserted into the pressure passage 724 and a relief spring 782 disposed in the spring housing chamber 725, the relief spring 782 urging the valve body 781 toward the hydraulic chamber 711 side.

In the tensioner 710, when oil pressure in the hydraulic chamber 711 rises, the valve body 781 moves toward the front side resisting an urging force of the relief spring 782. The pressure passage 724 communicates with the outflow port 723 and the oil is relieved from the outflow port 723.

In such a tensioner 710, the structure of the plunger 720 is complicated, machining accuracy is requested, and assembly is also complicated.

Therefore, a tensioner is well known in which a member configuring an orifice is inserted into a plunger and an external relief hole communicating with an external space is provided in the plunger to simplify the structure of the plunger and facilitate assembly (see, for example, Japanese Patent Application Publication No. 2003-194164).

However, in the tensioner described in Japanese Patent Application Publication No. 2003-194164, a member (a bent disk 32) configuring the orifice is held between the distal end of a spring that urges the plunger and the bottom surface of an internal space of the plunger. Oil or air is discharged through a gap between the outer circumferential surface of the orifice configuring member and the inner circumferential surface of the internal space of the plunger. Therefore, a gap between the inner circumferential surface of the plunger hole and the outer circumferential surface of the orifice configuring member sometimes deviates in the circumferential direction. When a portion where the gap is narrowed is located on the upward side in the gravity direction in which mixed air accumulates, the mixed air less easily comes out.

Fluctuation easily occurs in an outflow amount of the oil because of fluctuation in the length of the orifice due to the influence of the gap. A gap is easily formed between the orifice configuring member and the bottom surface of the internal space of the plunger (the orifice configuring member easily floats). It is difficult to properly maintain the oil pressure in the hydraulic chamber. Further, when the plunger comes off during maintenance, components disposed on the inside of the plunger cannot be guaranteed.

In general, the housing and the plunger configuring the tensioner is made of metal. Therefore, the mass of the housing and the plunger is large, which is undesirable in these days when there is a demand for low fuel consumption of an automobile mounted with the tensioner. Therefore, there is a demand for a reduction in the weight of the tensioner.

SUMMARY OF THE INVENTION

Therefore, the present invention solves these problems, and an object of the present invention is to provide a tensioner that has simple structure and is easily assembled, can be reduced in weight, and is capable of properly maintaining oil pressure in a hydraulic chamber.

The present invention provides a tensioner including: a plunger including a plunger hole opening on a rear side; a housing including a plunger housing hole opening on a front side that houses the plunger; main urging means for urging the plunger toward the front side; and an orifice member that causes an inside of a hydraulic chamber formed between the plunger housing hole and the plunger hole and an external space to communicate. The plunger includes an external relief hole opening on a top surface on the front side of the plunger hole and communicating with the external space. The orifice member includes a deformed fitting section deformed to fit on an inner circumferential surface of the plunger hole, an orifice groove provided on a surface in contact with the top surface, and a communication section that causes the surface in contact with the top surface and a surface on the hydraulic chamber side to communicate. The orifice groove is formed to communicate with the communication section and the external relief hole and thus to constitute an orifice. Consequently, the present invention solves the problems.

According to a first aspect of the present invention, the orifice member includes the deformed fitting section deformed to fit on the inner circumferential surface of the plunger hole. Consequently, the orifice member can be fit and fixed in the plunger with a light force. Therefore, it is easy to assemble the tensioner. It is possible to improve flexibility during the assembly of the tensioner and flexibility of design of the tensioner. Further, it is possible to prevent an assembly deficiency during maintenance from occurring.

It is possible to surely prevent a gap from being formed between the surface on which the orifice groove is formed in the orifice member and the top surface on the front side of the plunger hole. Further, it is possible to determine a center position of the orifice member with respect to the plunger and prevent fluctuation in an oil outflow amount due to fluctuation in the length of the orifice from occurring.

Therefore, when the oil pressure in the hydraulic chamber rises, it is possible to discharge the oil in the hydraulic chamber to the outside of the plunger through the communication section formed in the orifice member, the orifice configured by the orifice groove formed in the orifice member and the top surface on the front side of the plunger hole, and the external relief hole provided in the plunger. In this way, despite simple structure in which the orifice member is disposed in the plunger, it is possible to appropriately maintain the oil pressure in the hydraulic chamber. Therefore, it is possible to prevent excessive tensioning of a chain due to an excessively large pressing force.

According to a second aspect of the present invention, the orifice member is made of a resin material. Consequently, it is possible to realize a reduction in the weight of the tensioner. It is easier to assemble the tensioner. It is easy to mold the tensioner. Therefore, it is possible to contribute to improvement of fuel consumption and a reduction in cost of an automobile mounted with the tensioner.

According to a third aspect of the present invention, the communication section is configured by a cutout groove section provided on an outer circumferential surface of the orifice member. Consequently, in a relation with an attachment posture of the tensioner, it is possible to easily position the communication section such that mixed air in the hydraulic chamber easily comes out. Therefore, air is quickly discharged after an oil supply start. It is possible to cause the tensioner to quickly function during an engine start. It is possible to reduce flapping noise of the chain.

According to a fourth aspect of the invention, the orifice member functions as a spring receiving section for a coil spring, which is the main urging means. Consequently, it is possible increase the surface pressure of the orifice member on the top surface on the front side of the plunger hole. Therefore, it is possible to more surely prevent a gap from being formed between the surface on which the orifice groove is formed in the orifice member and the top surface on the front side of the plunger hole.

According to a fifth aspect of the present invention, the orifice member includes an extending section inserted through an inside of the coil spring, which is the main urging means, and extending along a coil axis. Consequently, it is possible to reduce the capacity of the hydraulic chamber. Therefore, since a time for filling the oil in the hydraulic chamber during the engine start can be reduced, it is possible to cause the tensioner to quickly function during the engine start. It is possible to reduce flapping noise of the chain. Since an amount of oil supplied to the tensioner can be reduced, it is possible to reduce a load of an internal combustion engine that drives an oil pump. It is possible to prevent the load of the internal combustion engine from leading to deterioration in fuel consumption of the internal combustion engine.

BRIEF DESCRIPTION OF THE DRAWINGS

FIGS. 9A and 9B are diagrams showing still another configuration example of the orifice member, FIG. 9A being a perspective view of the orifice member viewed from one surface side of the base body section and FIG. 9B being a plan view of the orifice member viewed from the other surface side of the base body section;

FIG. 10 is a sectional view showing a configuration example of an existing tensioner.

DESCRIPTION OF THE PREFERRED EMBODIMENT

A tensioner of the present invention is explained below with reference to the drawings.

Figure 11:
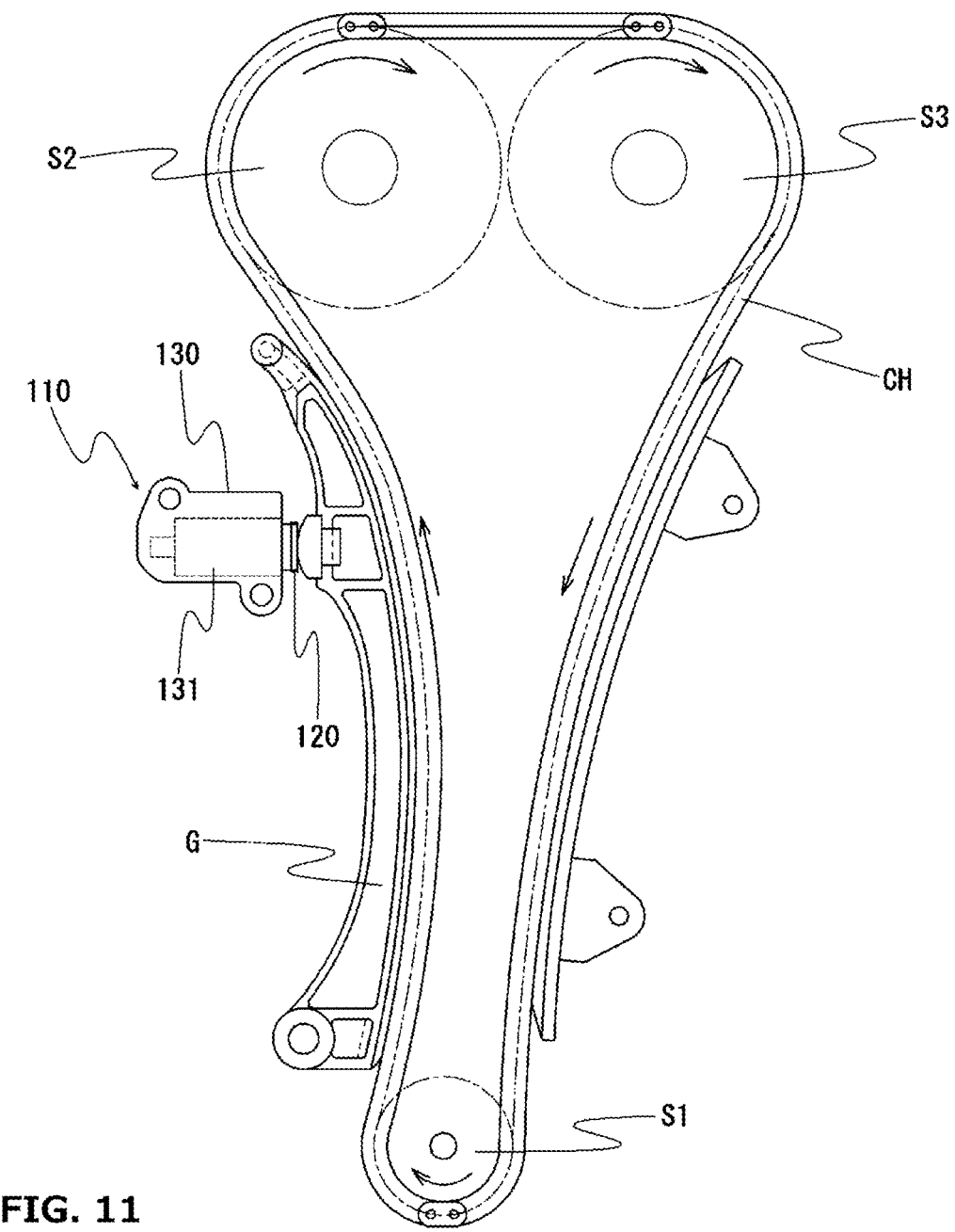
FIG. 11 is an explanatory diagram showing a timing system incorporating the tensioner.

A tensioner 110 is incorporated in a chain transmission device used in, for example, a timing system of an automobile engine. As shown in FIG. 11, the tensioner 110 is attached to an engine block (not shown in FIG. 11). The tensioner 110 applies, via a tensioner lever G, proper tension to a slack side of a transmission chain CH wound around a plurality of sprockets S1 to S3 and reduces vibration that occurs during traveling.

Figure 1:
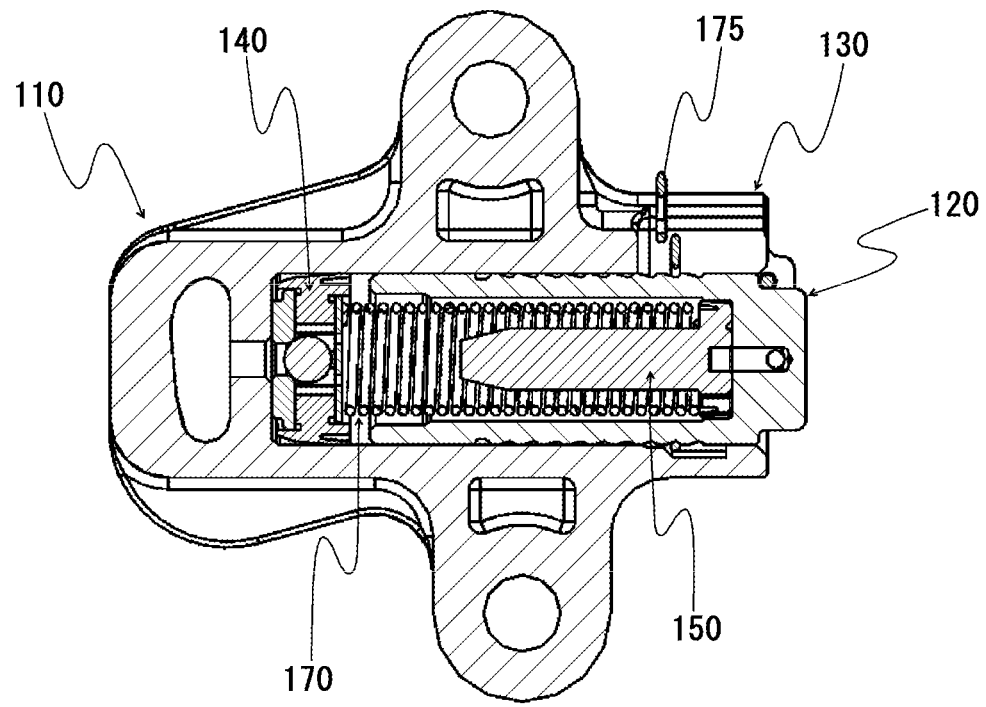
FIG. 1 is a sectional view showing a configuration example of a tensioner of the present invention.
Figure 2:
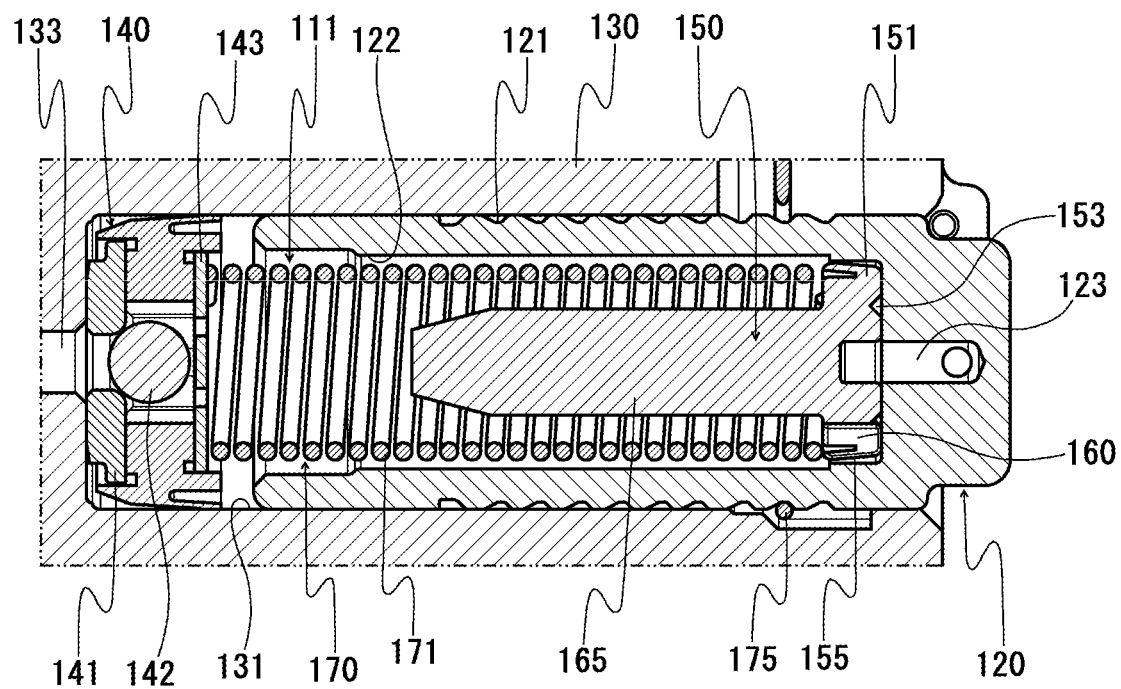
FIG. 2 is an enlarged sectional view showing a main part of the tensioner shown in FIG. 1.

FIG. 1 is a sectional view showing a configuration example of the tensioner of the present invention. FIG. 2 is an enlarged sectional view showing a main part of the tensioner shown in FIG. 1.

The tensioner 110 includes a plunger 120, a housing 130, main urging means 170, and an orifice member 150.

The plunger 120 is formed in a cylindrical shape and includes a plunger hole 122 opening on the rear side.

An uneven groove 121, with which an elastic ring 175 that restricts movement of the plunger 120 in the axial direction engages to constitute a ratchet mechanism, is provided on the outer circumferential surface of the plunger 120.

The plunger 120 includes an external relief hole 123 communicating with an external space of the tensioner 110. One end of the external relief hole 123 opens on the top surface on the front side of the plunger hole 122. The other end of the external relief hole 123 opens on the outer circumferential surface in the radial direction of the plunger 120.

The housing 130 includes a plunger housing hole 131 opening on the front side that slidably houses the plunger 120. The plunger 120 is inserted into the plunger housing hole 131 from an open end side of the plunger housing hole 131 and disposed in the plunger housing hole 131. A hydraulic chamber 111 is formed between the plunger hole 122 and the plunger housing hole 131, that is, formed by an internal space of the plunger housing hole 131 and an internal space of the plunger hole 122.

The housing 130 is briefly illustrated. A detailed configuration of a ratchet claw or the like that engages with the uneven groove 121 provided on the outer circumferential surface of the plunger 120 is omitted.

A check valve 140 configuring a nonreturn valve that allows inflow of oil into the hydraulic chamber 111 from the outside through an oil supply hole 133 and prevents outflow of the oil from the oil supply hole 133 is disposed on the bottom side of the housing 130.

The check valve 140 is configured from a ball seat 141 disposed to adhere to the bottom of the plunger housing hole 131, a spherical check ball 142 seated to be adherable to the ball seat 141, and a retainer 143 disposed in front of the check ball 142, the retainer 143 restricting movement of the check ball 142.

A ball spring that urges the check ball 142 toward the ball seat 141 side may be disposed between the check ball 142 and the retainer 143.

The main urging means 170 urges the plunger 120 toward the front side. The main urging means 170 is configured by, for example, a coil spring 171.

In the hydraulic chamber 111, the coil spring 171 is disposed such that a coil axis extends along the center axis of the plunger 120.

The orifice member 150 is a member that causes the inside of the hydraulic chamber 111 and the external space of the tensioner 110 to communicate, discharges air mixed in the hydraulic chamber 111 to the outside of the tensioner 110, and restricts an outflow amount of the oil from the hydraulic chamber 111.

Figure 3A:
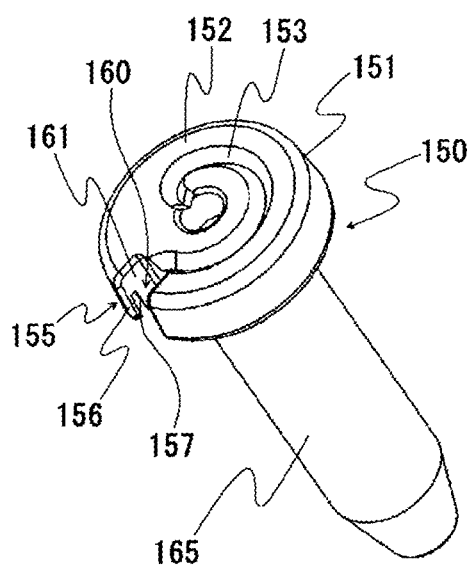
FIGS. 3A and 3B are diagrams showing an orifice member in the tensioner shown in FIG. 1, FIG. 3A being a perspective view of the orifice member viewed from one surface side of a base body section and FIG. 3B being a plan view of the orifice member viewed from the other surface side of the base body section.
Figure 3B:
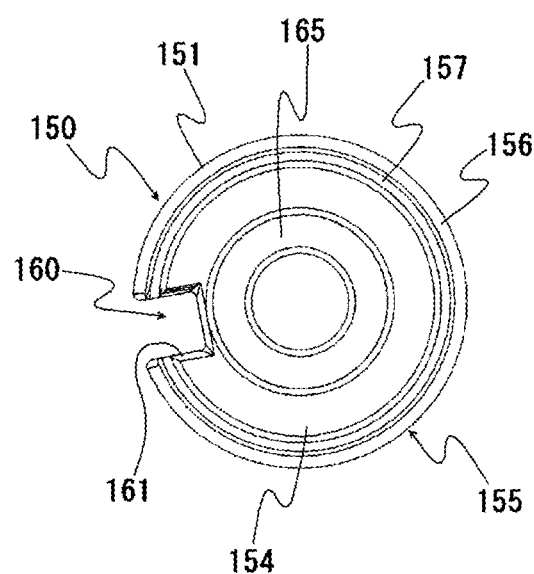

The orifice member 150 includes, as shown in FIGS. 3A and 3B, a truncated cone-shaped base body section 151 expanding in diameter from one surface 152 toward the other surface 154 and a rod-like extending section 165 continuous to the other surface 154 of the base body section 151 and extending in a direction perpendicular to the other surface 154.

The orifice member 150 is pressed into the plunger hole 122 and fixed in a state in which the one surface 152 of the base body section 151 is set in contact with the top surface on the front side of the plunger hole 122. The orifice member 150 is disposed in a state in which the extending section 165 extends to the inner circumferential side of the coil spring 171, that is, a state in which the extending section 165 is inserted into the inside of the coil spring 171 and extends along the coil axis.

The orifice member 150 also functions as a spring receiving section for the coil spring 171. One end face of the coil spring 171 is set in contact with the other surface 154 located on the hydraulic chamber 111 side of the base body section 151.

In the base body section 151, a deformed fitting section 155 pressed into the plunger hole 122 to be deformed and fit on the inner circumferential surface of the plunger hole 122 is formed.

In the orifice member 150, an outer circumferential groove 157 extending over the entire circumference in the circumferential direction is formed in a position on the outer circumferential edge side on the other surface 154 of the base body section 151. The deformed fitting section 155 is configured by a thin tubular portion 156 located outward in the radial direction of the outer circumferential groove 157.

In the tensioner 110 in this embodiment, the orifice member 150 is formed of, for example, a resin material. The resin material forming the orifice member 150 is desirably a material that exerts excellent heat resistance. Specifically, for example, polyamide resin such as nylon 46, nylon 66, or glass fiber reinforced nylon can be used.

In the base body section 151 of the orifice member 150, a communication section 160 that causes the one surface 152 set in contact with the top surface on the front side of the plunger hole 122 and the other surface 154 located on the hydraulic chamber 111 side to communicate is formed.

The communication section 160 in the orifice member 150 is configured by a cutout groove section 161 provided on the outer circumferential surface of the base body section 151.

On the one surface 152 of the base body section 151 in the orifice member 150, an orifice groove 153 V-shaped in cross section extending in a spiral shape is formed to communicate with the communication section 160 and the external relief hole 123 in the plunger 120 and thus to constitute an orifice.

In the tensioner 110 in this embodiment configured as explained above, when the plunger 120 receives a shock, a load, or the like from the transmission chain CH and the oil pressure in the hydraulic chamber 111 rises, the oil in the hydraulic chamber 111 flows into the orifice formed on one surface side of the base body section 151 via the communication section 160 in the orifice member 150. The oil leaks from the orifice via the external relief hole 123 in the plunger 120. Consequently, the oil pressure in the hydraulic chamber 111 is maintained at appropriate magnitude.

When air mixes in the hydraulic chamber 111, similarly, the mixed air intrudes into the orifice formed on the one surface side of the base body section 151 via the communication section 160 in the orifice member 150. The mixed air is discharged from the orifice to the external space via the external relief hole 123 in the plunger 120.

In the tensioner 110 in this embodiment, the orifice member 150 is pressed into the plunger hole 122, whereby the tubular portion 156 in the base body section 151 is deformed to bend to the radial direction inward side. Consequently, the orifice member 150 can be fit and fixed in the plunger 120 with a light force. Therefore, it is easy to assemble the tensioner 110. It is possible to improve flexibility during the assembly of the tensioner 110 and flexibility of design of the tensioner 110. Further, it is possible to prevent an assembly deficiency during maintenance from occurring. It is also possible to use, during the assembly of the tensioner 110, existing press-in equipment for pressing an orifice configuring member made of metal into a plunger. It is possible to advantageously manufacture an expected tensioner 110.

It is possible to surely prevent a gap from being formed between the one surface 152 of the base body section 151 in the orifice member 150 and the top surface on the front side of the plunger hole 122. Further, it is possible to determine a center position of the orifice member 150 with respect to the plunger 120 and prevent fluctuation in an outflow amount of the oil due to fluctuation in the length of the orifice from occurring. Therefore, despite simple structure in which the orifice member 150 is disposed in the plunger 120, it is possible to appropriately maintain the oil pressure in the hydraulic chamber 111 by discharging the oil in the hydraulic chamber 111 to the outside of the plunger 120 through the communication section 160, the orifice, and the external relief hole 123 when the oil pressure in the hydraulic chamber 111 rises. It is possible to prevent excessive tensioning of the transmission chain CH due to an excessively large pressing force.

In the tensioner 110 in this embodiment, the orifice member 150 is made of a resin material. Consequently, it is possible to realize a reduction in the weight of the tensioner 110. It is easier to assemble the tensioner 110. It is easy to mold the tensioner 110. Therefore, it is possible to contribute to improvement of fuel consumption and a reduction in cost of an automobile mounted with the tensioner 110.

With the orifice member 150 made of the rein material, a pressing force on the inner wall of the plunger hole 122 by a press-in force can be reduced. Therefore, it is possible to reduce the thickness of the plunger 120 itself. In this regard as well, it is possible to realize a reduction in the weight of the tensioner 110.

Furthermore, in the tensioner 110 in this embodiment, the communication section 160 is configured by the cutout groove section 161 provided on the outer circumferential surface of the base body section 151. Consequently, positioning of the communication section 160 can be easily performed. Therefore, when the tensioner 110 is attached, for example, in a posture in which the center axis of the plunger 120 is directed to an upward inclining direction, the communication section 160 is located on the gravity direction upward side. Consequently, air is quickly discharged after an oil supply start. It is possible to cause the tensioner 110 to quickly function during an engine start. It is possible to reduce flapping noise of the transmission chain CH.

Furthermore, in the tensioner 110 in this embodiment, the orifice member 150 functions as the spring receiving section for the coil spring 171, which is the main urging means 170. Consequently, it is possible increase the surface pressure of the orifice member 150 on the top surface on the front side of the plunger hole 122. Therefore, it is possible to more surely prevent a gap from being formed between the one surface 152 of the base body section 151 in the orifice member 150 and the top surface on the front side of the plunger hole 122.

Furthermore, in the tensioner 110 in this embodiment, the orifice member 150 includes the extending section 165 inserted through the inside of the coil spring 171 and extending along the coil axis. Consequently, the capacity of the hydraulic chamber 111 can be reduced. Therefore, since a time for filling the oil in the hydraulic chamber 111 during the engine start can be reduced, it is possible to cause the tensioner 110 to quickly function during the engine start. It is possible to reduce flapping noise of the transmission chain CH. Since an amount of the oil supplied to the tensioner 110 can be reduced, it is possible to reduce a load of an internal combustion engine that drives an oil pump. It is possible to prevent the load of the internal combustion engine from leading to deterioration in fuel consumption of the internal combustion engine.

In the tensioner 110 in this embodiment, the deformed fitting section 155 of the orifice member 150 is configured by the thin tubular portion 156 located outward in the radial direction of the outer circumferential groove 157 formed on the other surface 154 of the base body section 151. However, the deformed fitting section 155 of the orifice member 150 is not particularly limited if the deformed fitting section 155 is pressed into the plunger hole 122 to be deformed and fit on the inner circumferential surface of the plunger hole 122.

Figure 4A:
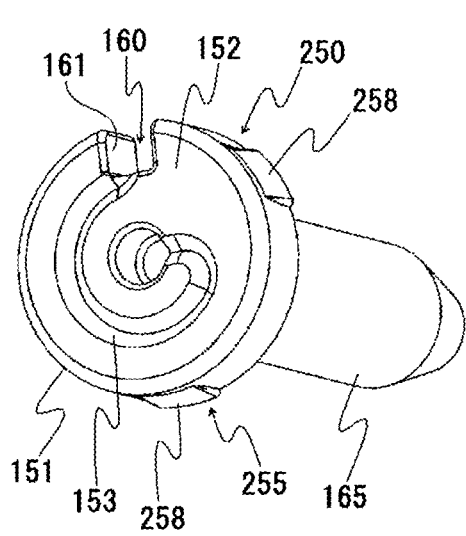
FIGS. 4A and 4B are diagrams showing another configuration example of the orifice member, FIG. 4A being a perspective view of the orifice member viewed from one surface side of the base body section and FIG. 4B being a perspective view of the orifice member viewed from the other surface side.
Figure 4B:
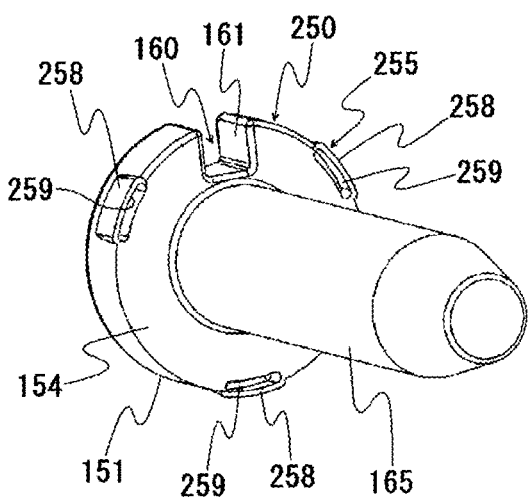

FIGS. 4A and 4B are diagrams showing another configuration example of the orifice member.

An orifice member 250 has the same configuration as the configuration of the orifice member 150 shown in FIGS. 3A and 3B except that a deformed fitting section 255 is formed by a plurality of projections 258 projecting outward in the radial direction formed in positions separated from each other in the circumferential direction on the outer circumferential surface of the base body section 151.

In each of the projections 258 of the orifice member 250, the outer surface set in press-contact with the inner circumferential surface of the plunger hole 122 is formed in a taper shape such that projection height increases from one surface side toward the other surface side of the base body section 151. Elastic holes 259 are formed on the other surfaces of the respective projections 258. The insides of the projections 258 are formed as hollows.

The orifice member 250 is pressed into the plunger hole 122, whereby the outer surface of each of the plurality of projections 258 in the base body section 151 is deformed to bend to the radial direction inward side. The orifice member 250 is fit and fixed on the inner circumferential surface of the plunger hole 122.

Figure 5A:
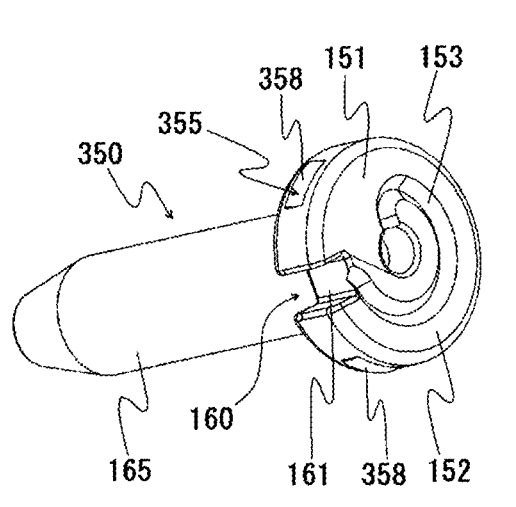
FIGS. 5A and 5B are diagrams showing still another configuration example of the orifice member, FIG. 5A being a perspective view of the orifice member viewed from one surface side of the base body section and FIG. 5B being a plan view of the orifice member viewed from the other surface side of the base body section.
Figure 5B:
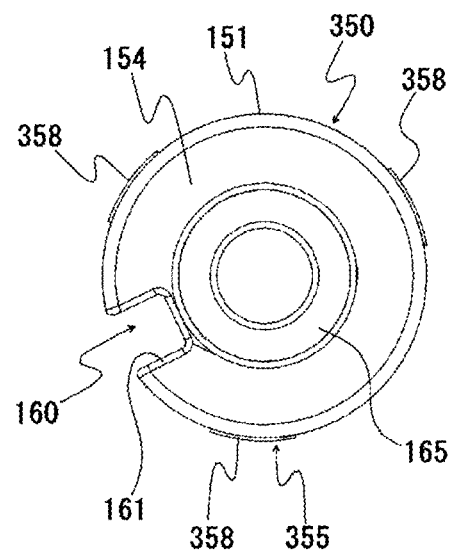

As shown in FIGS. 5A and 5B, each of a plurality of projections 358 configuring a deformed fitting section 355 may be configured not to include a hollow on the inside. An orifice member 350 is pressed into the plunger hole 122, whereby each of the plurality of projections 358 in the base body section 151 is deformed to be crushed in the radial direction. The orifice member 350 is fit and fixed on the inner circumferential surface of the plunger hole 122.

In the orifice member 250 shown in FIGS. 4A and 4B and the orifice member 350 shown in FIGS. 5A and 5B, the number of the projections 258 and 358 can be set as appropriate. The orifice members 250 and 350 can be fixed in a proper posture if at least three projections 258 and 358 are provided.

Figure 6:
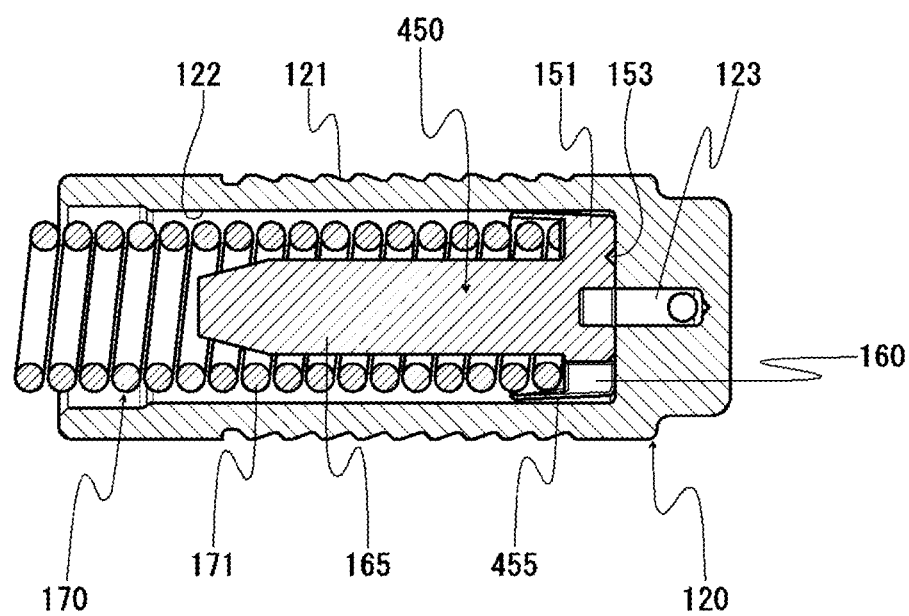
FIG. 6 is an enlarged sectional view showing a main part in another configuration example of the tensioner according to the present invention.
Figure 7A:
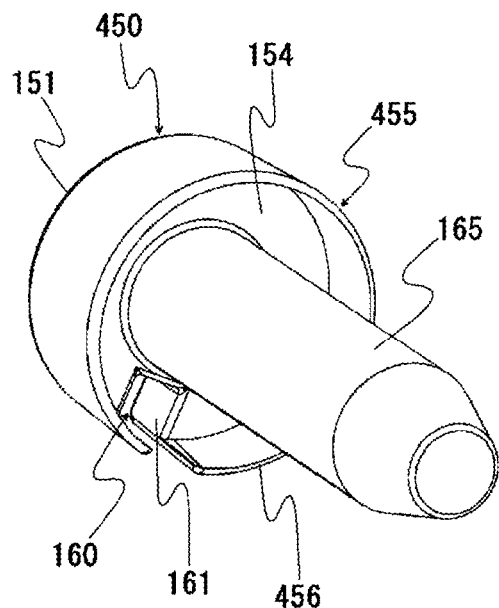
FIGS. 7A and 7B are diagrams showing still another configuration example of the orifice member, FIG. 7A being a perspective view of the orifice member viewed from the other surface side of the base body section and FIG. 7B being a plan view of the orifice member viewed from one surface side of the base body section.
Figure 7B:
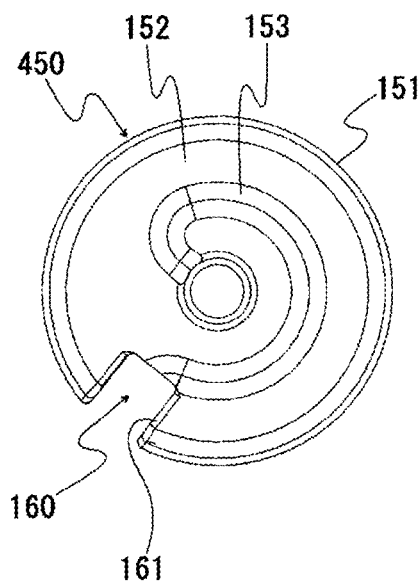

Furthermore, for example, as shown in FIG. 6, a deformed fitting section 455 of an orifice member 450 may be configured to form a space that accepts a one end side portion (a front side portion) of the coil spring 171, which is the main urging means 170. As shown in FIGS. 7A and 7B, the deformed fitting section 455 of the orifice member 450 is configured by a tubular portion 456 formed to project and extend outward in the axial direction from the other surface 154 of the base body section 151 in an outer circumferential edge position on the other surface 154 of the base body section 151. The outer circumferential surface of the tubular portion 456 is formed in a taper shape continuous to the outer circumferential surface of the base body section 151. The orifice member 450 has the same configuration as the orifice member 150 shown in FIGS. 3A and 3B except that the configuration of the deformed fitting section 455 is different.

The orifice member 450 is pressed into the plunger hole 122, whereby the tubular portion 456 is deformed to bend to the radial direction inward side. The orifice member 450 is fit and fixed on the inner circumferential surface of the plunger hole 122.

In tensioners including such orifice members 250, 350, and 450, it is possible to obtain the same effects as the effects of the tensioner 110 including the orifice member 150 having the configuration explained above.

Figure 8A:
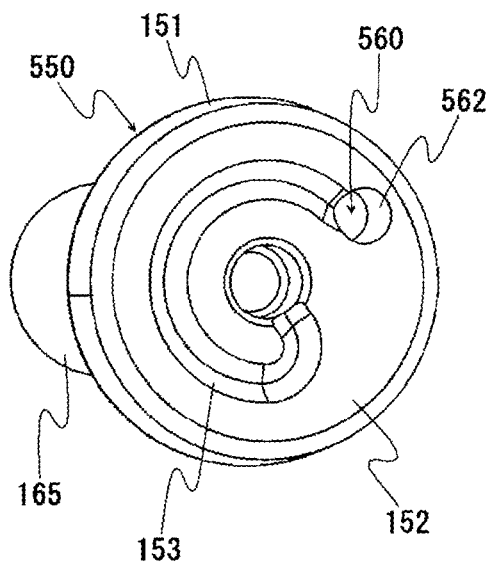
FIGS. 8A and 8B are diagrams showing still another configuration example of the orifice member, FIG. 8A being a perspective view of the orifice member viewed from one surface side of the base body section and FIG. 8B being a plan view of the orifice member viewed from the other surface side of the base body section.
Figure 8B:
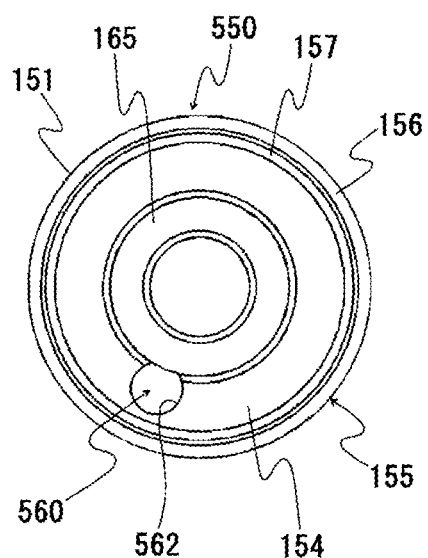

The communication section 160 of the orifice member 150 does not need to be configured by the cutout groove section 161 if the communication section 160 is configured to cause the one surface 152 in contact with the top surface on the front side of the plunger hole 122 and the other surface 154 on the hydraulic chamber 111 side to communicate. For example, as shown in FIGS. 8A and 8B, a communication section 560 may be configured by a through-hole 562 extending in the thickness direction of the base body section 151.

In a tensioner including an orifice member 550 having such a configuration, in a relation with an attachment posture of the tensioner, it is possible to easily position the communication section 560 such that mixed air in the hydraulic chamber 111 easily comes out.

Furthermore, in the tensioner of the present invention, for example, as shown in FIGS. 9A and 9B, an orifice member 650 may be configured to not include an extending section. The orifice member 650 has the same configuration as the configuration of the orifice member 150 shown in FIGS. 3A and 3B except that the orifice member 650 does not include an extending section.

The embodiment of the present invention is explained in detail above. However, the present invention is not limited to the embodiment explained above. Various design changes can be made without departing from the present invention described in the claims.

For example, in the embodiment explained above, the tensioner 110 is explained as being incorporated in the timing system for the automobile engine. However, a specific use of the tensioner 110 is not limited to this.

In the embodiment explained above, the tensioner 110 is explained as applying tension to the transmission chain CH via the tensioner lever G. However, sliding guide of the transmission chain CH may be directly performed by the distal end of the plunger 120 to apply tension to the transmission chain CH.

Further, the tensioner 110 is not limitedly applied to a transmission mechanism by the transmission chain CH and may be applied to a similar transmission mechanism such as a rope. The tensioner 110 can be used in various industrial fields if application of tension to a long object is requested in uses.

In the embodiment explained above, the housing 130 that houses the plunger 120 is explained as a so-called tensioner body attached to an engine block or the like. However, a specific form of the housing 130 is not limited to the above and may be a so-called sleeve having a cylindrical shape inserted into a body hole formed in the tensioner body.

What is claimed is:

1. A tensioner comprising:
a plunger including a plunger hole opening on a rear side;
a housing including a plunger housing hole opening on a front side that slidably houses the plunger;
a main urging means for urging the plunger toward the front side; and
an orifice member that causes an external space to communicate with an inside of a hydraulic chamber that is formed between the plunger housing hole and the plunger hole, wherein
the plunger includes an external relief hole opening on a top surface on a front side of the plunger hole and communicating with the external space,
the orifice member is formed of a single member,
the orifice member includes a truncated cone-shaped base body section expanding in diameter from a surface in contact with the top surface toward a surface on the hydraulic chamber side,
the base body section includes a deformed fitting section deformed to fit on an inner circumferential surface of the plunger hole, an orifice groove provided on the surface in contact with the top surface, and a communication section that causes the surface in contact with the top surface and the surface on the hydraulic chamber side to communicate, and
the orifice groove is formed to communicate with the communication section and the external relief hole and thus to constitute an orifice.

2. The tensioner according to claim 1, wherein the orifice member is formed of a resin material.

3. The tensioner according to claim 1, wherein the communication section is a cutout groove section provided on an outer circumferential surface of the orifice member.

4. The tensioner according to claim 1, wherein
the main urging means is a coil spring, and
the orifice member also functions as a spring receiving section for the coil spring.

5. The tensioner according to claim 4, wherein the orifice member includes an extending section extending to an inner circumferential side of the coil spring.

* * * * *